(12) United States Patent
Morita et al.

(10) Patent No.: US 10,150,379 B2
(45) Date of Patent: Dec. 11, 2018

(54) CHARGING CONTROL DEVICE, VEHICLE, VEHICLE CHARGING SYSTEM, CHARGING CONTROL METHOD, AND PROGRAM

(71) Applicant: MITSUBISHI HEAVY INDUSTRIES ENGINEERING, LTD., Kanagawa (JP)

(72) Inventors: Katsuaki Morita, Tokyo (JP); Hisashi Motoyama, Tokyo (JP); Kyotaro Onishi, Tokyo (JP); Masato Suzuki, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 258 days.

(21) Appl. No.: 14/907,565

(22) PCT Filed: Oct. 23, 2014

(86) PCT No.: PCT/JP2014/078190
§ 371 (c)(1),
(2) Date: Jan. 26, 2016

(87) PCT Pub. No.: WO2015/068583
PCT Pub. Date: May 14, 2015

(65) Prior Publication Data
US 2016/0159237 A1    Jun. 9, 2016

(30) Foreign Application Priority Data

Nov. 5, 2013  (JP) .................................. 2013-229278

(51) Int. Cl.
*H02J 7/00*   (2006.01)
*B60L 11/18*  (2006.01)
*H02J 7/04*   (2006.01)

(52) U.S. Cl.
CPC ....... *B60L 11/1838* (2013.01); *B60L 11/1803* (2013.01); *B60L 11/1816* (2013.01);
(Continued)

(58) Field of Classification Search
CPC ...... B60L 5/36; B60L 5/38; B60L 5/39; B60L 5/40; B60L 5/42; B60L 5/24; B60L 5/26; B60L 9/18; B60L 2200/26; B60M 7/003
(Continued)

(56) References Cited

U.S. PATENT DOCUMENTS

| | | | | |
|---|---|---|---|---|
| 2013/0057213 A1* | 3/2013 | Kuraishi | ................... | H02J 5/00 320/109 |
| 2013/0113279 A1* | 5/2013 | Hatanaka | .................. | B60L 9/22 307/9.1 |

(Continued)

FOREIGN PATENT DOCUMENTS

| | | |
|---|---|---|
| JP | 2007-282495 A | 10/2007 |
| JP | 2011-223796 A | 11/2011 |

(Continued)

OTHER PUBLICATIONS

Office Action in JP Application No. JP2013-229278, dated Jun. 21, 2016.

(Continued)

*Primary Examiner* — David V Henze-Gongola
(74) *Attorney, Agent, or Firm* — Kanesaka Berner and Partners, LLP (57) ABSTRACT

A charging control device includes a power reception unit, a charging instruction output unit, and a travel instruction output unit. The power reception unit receives power from a power supply device when the power reception unit is present in a power supply area where the power from the power supply device can be supplied. The charging instruction output unit outputs a charging instruction relating to (Continued)

charging of a secondary battery using the power received by the power reception unit. The travel instruction output unit outputs a travel instruction relating to traveling of a vehicle provided with the charging control device. The secondary battery and a travel motor are electrically insulated from each other when the charging instruction output unit outputs a charging start instruction as the charging instruction for the secondary battery, and are electrically connected to each other when the travel instruction output unit outputs a travel start instruction for the vehicle.

9 Claims, 5 Drawing Sheets

(52) U.S. Cl.
CPC ....... *B60L 11/1818* (2013.01); *B60L 11/1837* (2013.01); *B60L 11/1861* (2013.01); *H02J 7/04* (2013.01); *B60L 2200/18* (2013.01); *B60L 2240/12* (2013.01); *B60L 2250/12* (2013.01); *B60L 2250/16* (2013.01); *Y02T 10/705* (2013.01); *Y02T 10/7005* (2013.01); *Y02T 10/7044* (2013.01); *Y02T 10/7072* (2013.01); *Y02T 90/121* (2013.01); *Y02T 90/128* (2013.01); *Y02T 90/14* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 2013/0140121 | A1* | 6/2013 | Huber | B60L 5/04 |
| | | | | 191/59.1 |
| 2014/0347017 | A1* | 11/2014 | Sugano | B60L 1/003 |
| | | | | 320/137 |

FOREIGN PATENT DOCUMENTS

| | | | | |
|---|---|---|---|---|
| JP | WO 2012014540 | A1 * | 2/2012 | ....... B60L 9/22 |
| JP | 2012-085535 | A | 4/2012 | |
| JP | 2012-85535 | A | 4/2012 | |
| JP | 2013-103548 | A | 5/2013 | |

OTHER PUBLICATIONS

International Search Report in PCT Application No. PCT/JP2014/078190, dated Dec. 2, 2014.

Written Opinion in PCT Application No. PCT/JP2014/078190, dated Dec. 2, 2014.

* cited by examiner

| MODE TRANSITION | OPERATION WHICH BECOMES TRIGGER FOR MODE TRANSITION | PROCESS IN MODE TRANSITION |
|---|---|---|
| M1 | KEY SWITCH ON | SW1 Close, SW2 Close, SW3 Close, SW4 Open, SW5 Open |
| M2 | KEY SWITCH OFF | SW3 Open, SW2 Open, SW1 Open, SW4 Open, SW5 Open |
| M3 | TCR MODE BUTTON ON | SW2 Open |
| M4 | TCR STRT BUTTON ON | SW4 Close |
| M5 | TERMINAL CHARGING COMPLETION | SW4 Open |
| M6 | DRV MODE BUTTON ON | SW2 Close |
| M7 | DCR MODE BUTTON ON | SW2 Open, SW5 Close |
| M8 | CHARGING START BUTTON OF DEPOT CHARGER ON (GROUND-SIDE DEPOT CHARGER OPERATION) | — |
| M9 | DEPOT CHARGING COMPLETION | — |
| M10 | DRV MODE BUTTON ON | SW2 Close, SW5 Open |
| M11 | TCR MODE BUTTON ON | SW5 Open |
| M12 | DCR MODE BUTTON ON | SW5 Close |
| M13 | KEY SWITCH OFF | SW3 Open, SW1 Open, SW5 Open |
| M14 | KEY SWITCH OFF | SW3 Open, SW1 Open, SW5 Open |
| M15 | KEY SWITCH OFF | SW3 Open, SW1 Open |
| M16 | KEY SWITCH OFF | SW3 Open, SW1 Open, SW4 Open |
| M17 | ALARM GENERATION | ALL SW Open |
| M18 | ALARM RESET | SW1 Close, SW2 Close, SW3 Close, SW4 Open, SW5 Open |

CHARGING CONTROL DEVICE, VEHICLE, VEHICLE CHARGING SYSTEM, CHARGING CONTROL METHOD, AND PROGRAM

RELATED APPLICATIONS

The present application is a National Phase of PCT/JP2014/078190, filed Oct. 23, 2014, and claims priority of Japanese Patent Application No. 2013-229278, filed on Nov. 5, 2013.

TECHNICAL FIELD

The present invention relates to a charging control device, a vehicle, a vehicle charging system, a charging control method, and a program.

BACKGROUND ART

Among secondary batteries mounted on a vehicle such as a plug-in hybrid car, a secondary battery capable of performing normal charging in which charging is performed through an in-vehicle charger from an AC power source of 100 V and performing fast charging in which charging is performed through a ground non-portable charger from an AC power source of 200 V may be used.

PTL 1 discloses a technique that provides various charging methods according to situations when both of a fast charging plug and a normal charging plug are connected to a vehicle in charging of a secondary battery.

CITATION LIST

Patent Literature

[PTL 1] Japanese Unexamined Patent Application Publication No. 2011-223796

SUMMARY OF INVENTION

Technical Problem

There is provided a plug-in hybrid car that includes an interlock and is set so that the vehicle cannot travel when a plug is connected to a charger. A control device of the plug-in hybrid car prevents starting of traveling of the vehicle while a secondary battery is being charged by interlock setting. Further, when the plug is disconnected from the charger by a user, the control device releases the interlock setting, and thus, the plug-in hybrid car is brought into a state in which traveling is possible.

However, for example, when the vehicle is an electric bus in which charging is performed through pantographs, even after charging of a secondary battery is completed, the pantographs are in contact with the charger. Thus, in the vehicle in which charging is performed through pantographs, it is not possible to perform interlock setting under the condition that the pantographs are in contact with the charger, as in the plug-in hybrid car. Accordingly, there is a concern that a vehicle in which charging is performed through pantographs may start traveling although the secondary battery is being charged.

Accordingly, in the vehicle in which charging is performed through pantographs, there is demand for a technique that prevents starting of traveling of the vehicle while the secondary battery is being charged and allows the start of traveling of the vehicle when charging of the secondary battery is completed.

The invention provides a charging control device, a vehicle, a vehicle charging system, a charging control method, and a program capable of preventing starting of traveling of a vehicle while a secondary battery is being charged and allowing the start of traveling of the vehicle when the charging of the secondary battery is completed.

Solution to Problem

According to a first aspect of the invention, there is provided a charging control device including a power reception unit, a charging instruction output unit, and a travel instruction output unit. The power reception unit receives power from a power supply device when the power reception unit is present in a power supply area where the power from the power supply device can be supplied. The charging instruction output unit outputs a charging instruction relating to charging of a secondary battery using the power received by the power reception unit. The travel instruction output unit outputs a travel instruction relating to traveling of a vehicle. The secondary battery and a travel motor are electrically insulated from each other when the charging instruction output unit outputs a charging start instruction as the charging instruction for the secondary battery, and are electrically connected to each other when the travel instruction output unit outputs a travel start instruction for the vehicle.

According to a second aspect of the invention, the charging instruction output unit provided in the charging control device outputs the charging instruction based on pressing of a button, and the travel instruction output unit outputs the travel start instruction based on pressing of a button.

According to a third aspect of the invention, the buttons provided in the charging control device are provided in a panel installed in a cab of the vehicle.

According to a fourth aspect of the invention, the charging instruction control unit provided in the charging control device outputs the charging instruction based on an algorithm of a program to be read and executed by a computer of the charging control device, and the travel instruction output unit outputs the travel instruction based on the algorithm of the program to be read and executed by the computer of the charging control device.

According to a fifth aspect of the invention, the power reception unit provided in the charging control device receives the power from the power supply device through a pantograph.

According to a sixth aspect of the invention, the power reception unit provided in the charging control device receives the power from the power supply device through a connector.

According to a seventh aspect of the invention, there is provided a vehicle including the charging control device.

According to an eighth aspect of the invention, there is provided a vehicle charging system including: a power supply device that supplies power through a power reception unit of a vehicle; and the vehicle.

According to a ninth aspect of the invention, there is provided a charging control method including: receiving power from a power supply device in a power supply area where the power from the power supply device can be supplied; outputting a charging instruction relating to charging of a secondary battery using the received power; outputting a travel instruction relating to traveling of a vehicle provided with the charging control method; electrically insulating the secondary battery and a travel motor when a charging start instruction is output as the charging instruction for the secondary battery; and electrically connecting the secondary battery and the travel motor when a travel start instruction for the vehicle is output.

According to a tenth aspect of the invention, there is provided a program that causes a computer of a charging control device to function as: power reception means for receiving power from a power supply device when the power reception means is present in a power supply area where the power from the power supply device can be supplied; charging start instruction output means for outputting a charging instruction relating to charging of a secondary battery using the power received by the power reception means; and travel start instruction output means for outputting a travel instruction relating to traveling of a vehicle provided with the charging control device, in which the secondary battery and a travel motor are electrically insulated from each other when the charging start instruction output means outputs a charging start instruction as the charging instruction for the secondary battery, and the secondary battery and the travel motor are electrically connected to each other when the travel start instruction output means outputs a travel start instruction for the vehicle.

Advantageous Effects of Invention

According to the charging control device, the vehicle, the vehicle charging system, the charging control method, and the program, a vehicle can prevent starting of traveling of the vehicle while the secondary battery is being charged and can start traveling when the charging of the secondary battery is completed.

DESCRIPTION OF EMBODIMENTS

Hereinafter, embodiments will be described with reference to the accompanying drawings.

Figure 1:
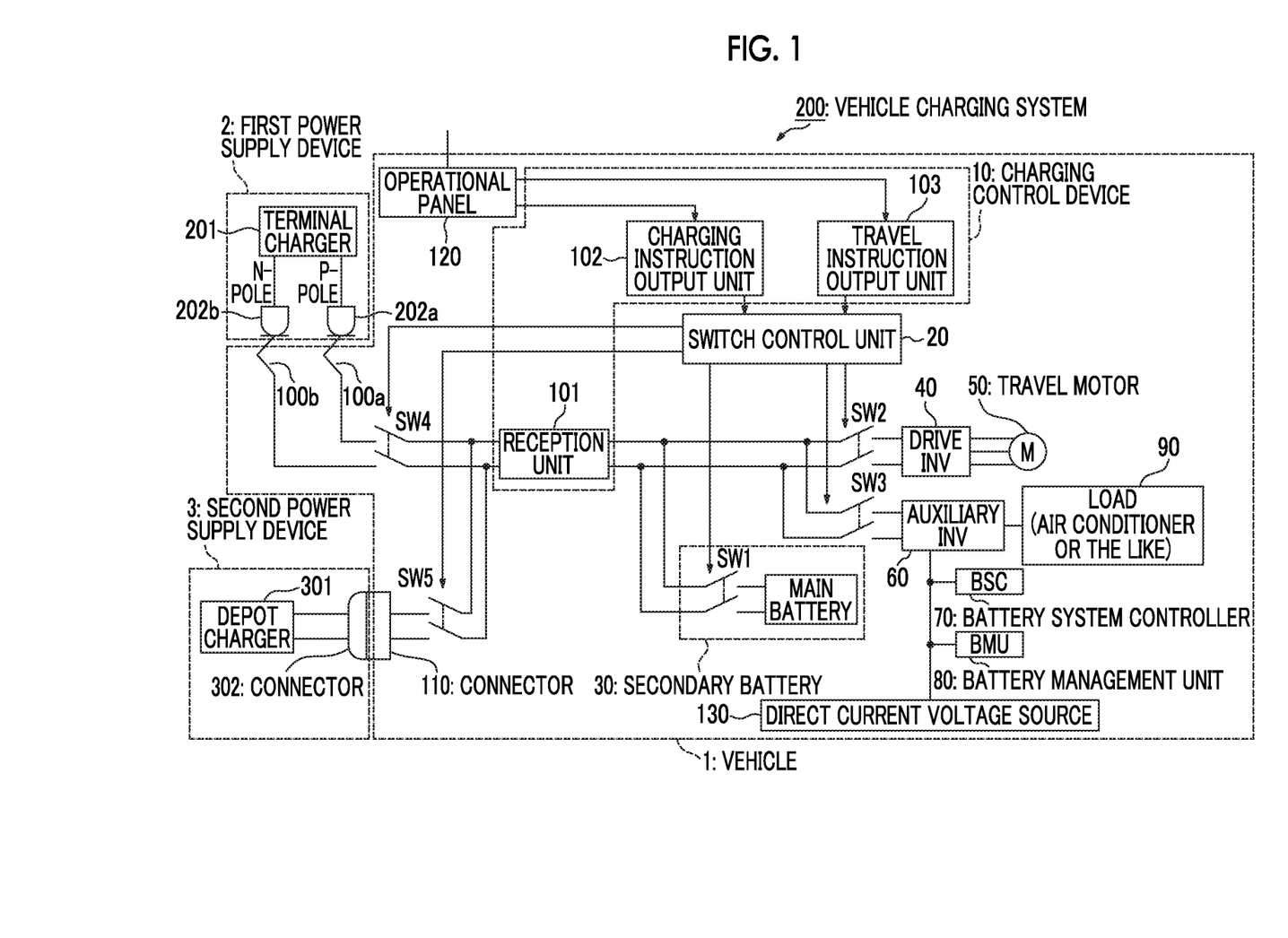
FIG. 1 is a diagram illustrating an example of a configuration of a vehicle charging system according to an embodiment of the invention.

FIG. 1 is a diagram illustrating an example of a configuration of a vehicle charging system 200 according to an embodiment of the invention.

As shown in FIG. 1, the vehicle charging system 200 according to this embodiment includes a vehicle 1, a first power supply device 2, and a second power supply device 3.

The vehicle 1 includes a charging control device 10, a switch control unit 20, a secondary battery 30, a drive inverter 40, a travel motor 50, an auxiliary inverter 60, a battery system controller 70, a battery management unit 80, a load 90 such as an air conditioner, pantographs 100 (100a and 100b), a connector 110, an operation panel 120, a DC voltage source 130, a switch SW2, a switch SW3, a switch SW4, and a switch SW5.

The charging control device 10 included in the vehicle 1 includes a power reception unit 101, a charging instruction output unit 102, and a travel instruction output unit 103.

The secondary battery 30 included in the vehicle 1 includes the switch SW1.

The first power supply device 2 includes a terminal charger 201, a P-pole terminal 202a, and an N-pole terminal 202b.

The second power supply device 3 includes a depot charger 301, and a connector 302.

The power reception unit 101 included in the charging control device 10 receives power from the first power supply device 2 when the power reception unit 101 is present in a power supply area where power from the first power supply device 2 can be supplied. Further, the power reception unit 101 receives power from the second power supply device 3 when the power reception unit 101 can be supplied with power from the second power supply device 3 through the connector 110.

The charging instruction output unit 102 included in the charging control device 10 outputs various charging instructions. Specifically, the charging instruction output unit 102 outputs a terminal charging start instruction when performing charging of the secondary battery 30 by power received by the power reception unit 101 from the first power supply device 2. The charging instruction output unit 102 outputs a terminal charging standby instruction when waiting to perform the charging of the secondary battery 30 by the power received by the power reception unit 101 from the first power supply device 2. The charging instruction output unit 102 outputs a depot charging start instruction when performing charging of the secondary battery 30 by power received by the power reception unit 101 from the second power supply device 3. The charging instruction output unit 102 outputs a depot charging standby instruction when waiting to perform the charging of the secondary battery 30 by the power received by the power reception unit 101 from the second power supply device 3. The charging instruction output unit 102 outputs a terminal charging stop instruction when stopping the charging of the secondary battery 30 by the power received by the power reception unit 101 from the second power supply device 2. The charging instruction output unit 102 outputs a terminal charging standby stop instruction when stopping waiting to perform the charging of the secondary battery 30 by the power received by the power reception unit 101 from the first power supply device 2. The charging instruction output unit 102 outputs a depot charging stop instruction when stopping the charging of the secondary battery 30 by the power received by the power reception unit 101 from the second power supply device 3. The charging instruction output unit 102 outputs a depot charging standby stop instruction when stopping waiting to perform the charging of the secondary battery 30 by the power received by the power reception unit 101 from the second power supply device 3.

The travel instruction output unit 103 included in the charging control device 10 outputs various travel instructions. Specifically, the travel instruction output unit 103 outputs a travel start instruction when allowing the vehicle 1 to travel. The travel instruction output unit 103 included in the charging control device 10 outputs a travel prohibition instruction when prohibiting the traveling of the vehicle 1.

The charging control device 10 outputs the charging start instruction when performing the charging of the secondary battery 30 by the power supplied from the first power supply device 2 or the second power supply device 3, and outputs the travel start instruction when allowing the vehicle 1 to travel.

The switch control unit 20 controls opening or closing of the switches SW1 to SW5 based on the charging start instruction and the travel start instruction from the charging instruction output unit 102 and the travel instruction output unit 103, respectively, provided in the charging control device 10.

The secondary battery 30 is a power source that drives the travel motor 50.

The drive inverter 40 converts a DC voltage output from the secondary battery 30 into a voltage for driving the travel motor 50.

The auxiliary inverter 60 converts a DC voltage output from the secondary battery 30 or a voltage (for example, 12 V, 24 V, or the like) output from the DC voltage source 130 connected to the battery system controller 70 or the battery management unit 80 into a voltage for driving the load 90 such as an air conditioner or another device.

The battery system controller 70 communicates with the battery management system, and manages a voltage of the entire battery system.

The battery management unit 80 manages a cell voltage of a main battery which is the secondary battery 30, and transmits its information to the battery system controller 70.

The load 90 is a load driven by a voltage converted by the auxiliary inverter 60. The load 90 is an air conditioner, or the like.

The pantographs 100 (100a and 100b) are connected to terminals 202 (202a and 202b) provided in the first power supply device 2, and receive power from the terminal charger 201.

The connector 110 is connected to the connector 302 provided in the second power supply device 3, and receives power from the depot charger 301.

The operation panel 120 outputs a signal depending on a driver or the like to the charging instruction output unit 102 or the travel instruction output unit 103.

The DC voltage source 130 is connected to the battery system controller 70 or the battery management unit 80. The DC voltage source 130 supplies a DC voltage for driving the battery system controller 70 or the battery management unit 80.

The switch SW1 connects or disconnects the secondary battery 30 to or from the switch SW2 and the switch SW3.

The switch SW2 connects or disconnects the switch SW1 to or from the drive inverter 40.

The switch SW3 connects or disconnects the switch SW1 to or from the auxiliary inverter 60.

The switch SW4 connects or disconnects the power reception unit 101 included in the charging control device 10 to or from the pantographs 100.

The switch SW5 connects or disconnects the power reception unit 101 included in the charging control device 10 to or from the connector 110.

The first power supply device 2 includes the terminal charger 201 and the terminals 202 (202a and 202b). For example, when the vehicle 1 is a bus, the first power supply device 2 is a device installed at a bus stop for charging the secondary battery 30 provided in the bus.

The terminal charger 201 supplies power for charging the secondary battery 30 provided in the vehicle 1.

The terminals 202 are a pair of terminals that are in contact with the pantographs 100. One of the terminals 202 is the P-pole terminal 202a, and the other one of the terminals 202 is the N-pole terminal 202b.

Further, the first power supply device 2 supplies power to the vehicle 1 from the terminal charger 201 through the terminals 202.

The second power supply device 3 includes the depot charger 301 and the connector 302. The second power supply device 3 is a device installed at a vehicle base where the vehicle 1 is parked at night, for example.

The depot charger 301 supplies power for charging the secondary battery 30 provided in the vehicle 1.

The connector 302 is connected to the connector 110 provided in the vehicle 1, and supplies power to the connector 110 from the depot charger 301.

With such a configuration, the charging control device 10 allows the switch control unit 20 to control the switches SW1 to SW3 according to connection situations between the first power supply device 2 and the second power supply device 3, and the vehicle 1. Thus, the vehicle 1 can prevents starting of traveling while the secondary battery 30 is being charged, and can start traveling when the charging of the secondary battery 30 is completed.

Figure 2:
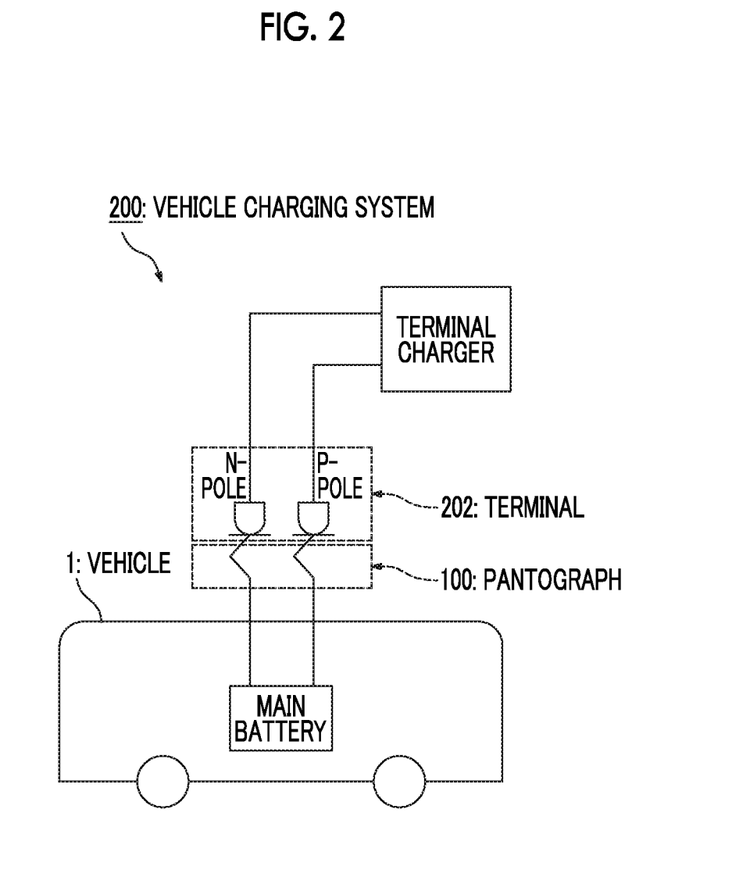
FIG. 2 is a diagram illustrating an example in which a main battery is charged in a vehicle 1 that includes a charging control device according to an embodiment of the invention.

FIG. 2 is a diagram illustrating an example in which the main battery is charged in the vehicle 1 that includes the charging control device 10 according to the embodiment of the invention.

Next, when the main battery is charged in the vehicle 1 that includes the charging control device 10 (not shown) according to the embodiment of the invention, control performed by the vehicle charging system 200 will be described.

FIG. 2 shows an example when the vehicle 1 that includes the charging control device 10 according to the embodiment of the invention receives power from the first power supply device 2 installed at a bus stop.

The vehicle 1 is stopped at the bus stop for allowing passengers to get on and off. A terminal charger is installed at the bus stop for power supply. That is, the bus stop is an example of a power supply area. The terminal charger includes the terminals 202 for supplying power to an external device. The vehicle 1 is stopped at a predetermined location in the bus stop, and then, the pantographs 100 provided in the vehicle 1 can be brought into contact with the terminals 202. As the pantographs 100 and the terminals 202 are brought into contact with each other, the vehicle 1 can receive power from the terminal charger.

It is not preferable that the vehicle 1 starts traveling while the main battery is being charged.

The vehicle 1 that includes the charging control device 10 according to the embodiment of the invention prevents starting of traveling while the secondary battery 30 that includes the main battery is being charged, and starts traveling when the charging of the secondary battery 30 is completed, as described below.

Figure 3:
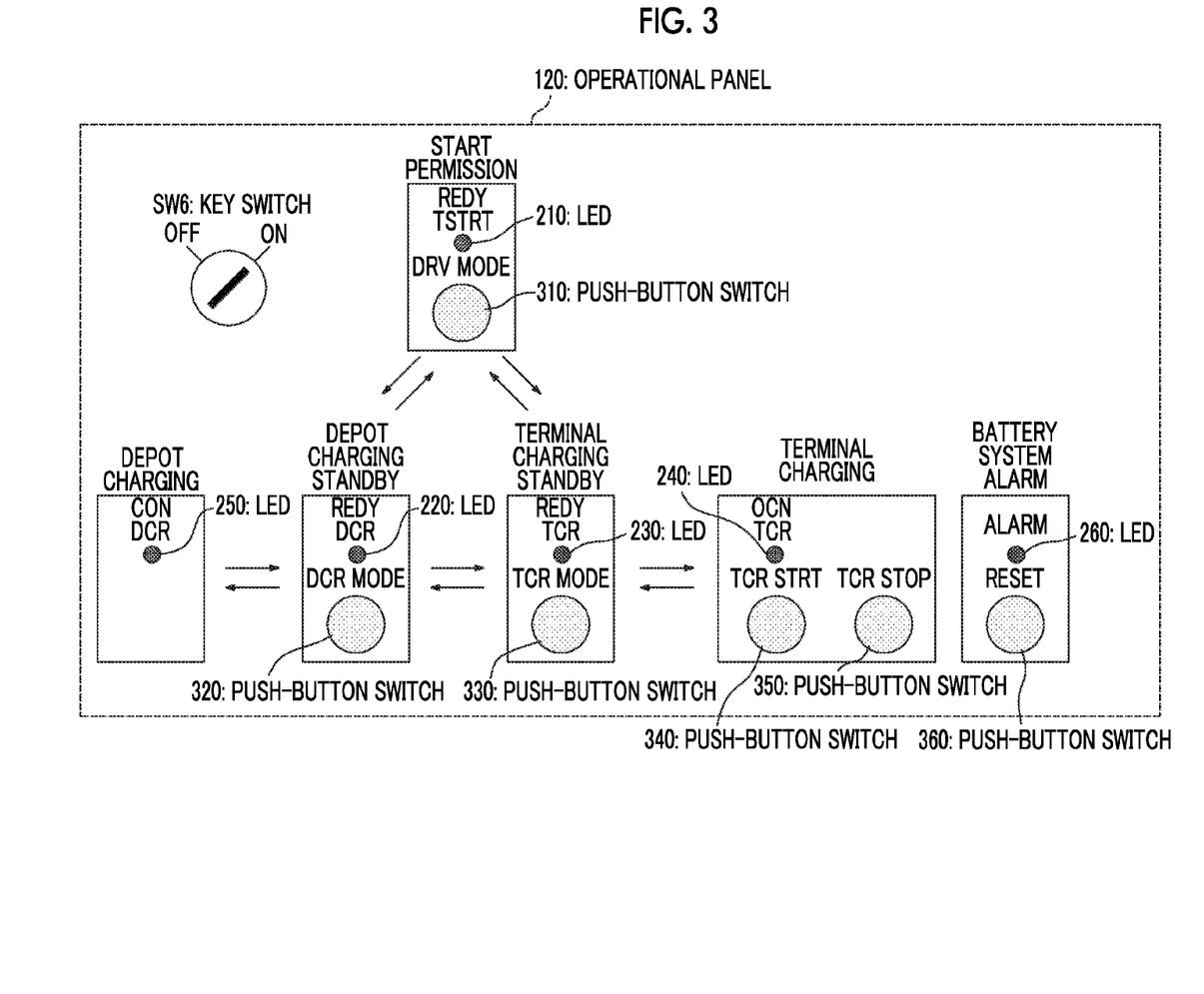
FIG. 3 is a diagram illustrating an example of an operation panel included in a vehicle according to an embodiment of the invention.

FIG. 3 is a diagram illustrating an example of the operation panel 120 provided in the vehicle 1 according to the embodiment of the invention.

The operation panel 120 is a panel for setting a charging mode or a travel mode, and for example, is disposed inside a cab. Since the operation panel 120 is disposed in the cab, the driver can easily perform a panel operation.

The operation panel 120 includes a key switch SW6, a light emitting diode (LED) 210, an LED 220, an LED 230, an LED 240, an LED 250, an LED 260, and a push-button switch 310, a push-button switch 320, a push-button switch 330, a push-button switch 340, a push-button switch 350, and a push-button switch 360.

The key switch SW6 is a switch for starting or terminating the operation of the operation panel 120.

The push-button switch 310 is a switch for setting a mode of the vehicle 1 to a travel mode.

The LED 210 is turned on while the mode of the vehicle 1 is set to the travel mode.

The push-button switch 320 is a switch for setting the mode of the vehicle 1 to a depot charging standby mode.

The LED 220 is turned on while the mode of the vehicle 1 is set to the depot charging standby mode.

The push-button switch 330 is a switch for setting the mode of the vehicle 1 to a terminal charging standby mode where charging is performed through the pantographs 100.

The LED 230 is turned on while the mode of the vehicle 1 is set to the terminal charging standby mode.

The mode of the vehicle 1 is stored in an internal memory (not shown) in the charging control device 10. The mode setting of the vehicle 1 is performed by performing rewriting with respect to the internal memory.

The push-button switch 340 is a switch for setting the mode of the vehicle 1 to a terminal charging start mode.

The LED 240 is turned on while terminal charging is performed.

The push-button switch 350 is a switch for setting the mode of the vehicle 1 to a terminal charging interruption mode where the terminal charging is interrupted.

In the depot charging standby mode, if the connector 110 and the connector 302 are connected to each other, the mode of the vehicle 1 is set to a depot charging start mode.

The LED 250 is turned on while depot charging is performed.

If an abnormality occurs in any mode of the vehicle 1, the mode of the vehicle 1 is set to an abnormality mode.

The LED 260 is turned on while an abnormality occurs in the vehicle 1.

The push-button switch 360 is a switch for releasing the abnormality mode and setting the mode of the vehicle 1 to the travel mode.

Figure 4:
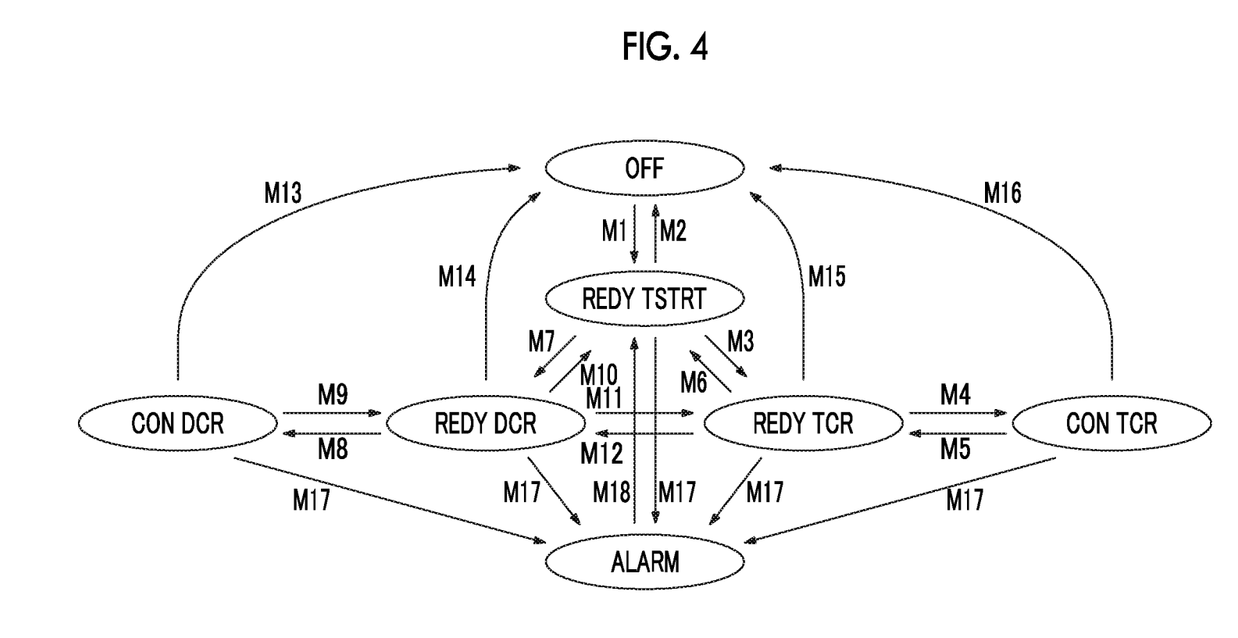
FIG. 4 is a diagram illustrating an example of mode transition in a vehicle according to an embodiment of the invention.

FIG. 4 is a diagram illustrating an example of mode transition in the vehicle 1 according to the embodiment of the invention.

As shown in the figure, in the vehicle 1 according to the embodiment of the invention, seven modes of "OFF", "REDY TSTRT (travel mode)", "REDY DCR (depot charging standby mode)", "REDY TCR (terminal charging standby mode)", "CON DCR (depot charging start mode)", "CON TCR (terminal charging start mode)", and "ALARM (abnormality mode)" are present.

The seven modes correspond to characters displayed on the operation panel 120 shown in FIG. 3. In the respective modes, when the driver operates the key switch SW6 or the push-button switch 310, 320, 330, 340, 350, or 360 shown in FIG. 3, the charging control device 10 performs transition of the mode of the vehicle 1 from a current mode to a different mode.

Figure 5:
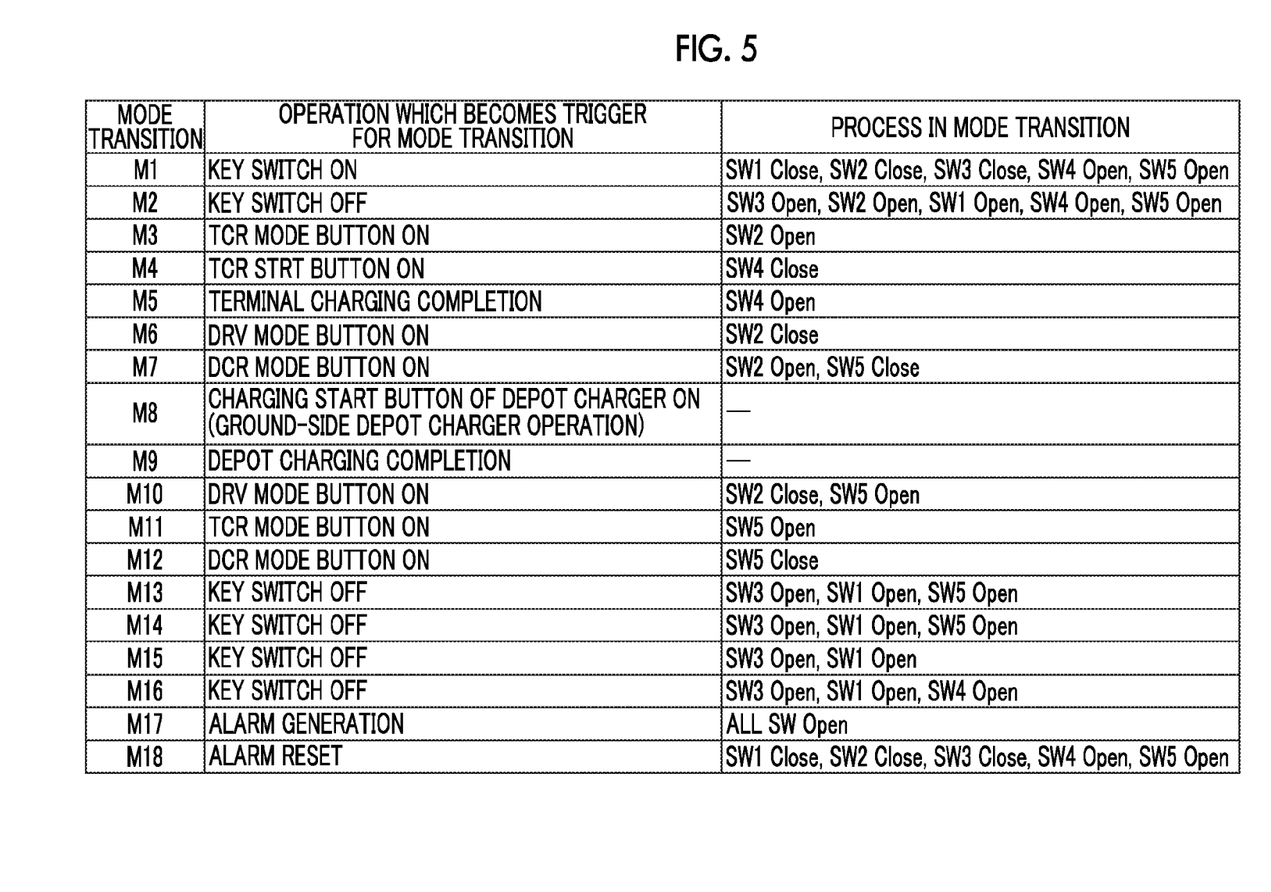
FIG. 5 is a diagram illustrating an example of mode transition conditions and processes in transition in a vehicle according to an embodiment of the invention.

FIG. 5 is a diagram illustrating an example of mode transition conditions and processes in transition in the vehicle 1 according to the embodiment of the invention.

FIG. 5 shows operations performed with respect to the operation panel 120 by the driver, that is, operations which become triggers for the mode transition, and processes performed by the charging control device 10 through the switch control unit 20 when the operations which become the triggers for the mode transition are performed, in the respective modes shown in FIG. 4. Further, the "mode transition" in FIG. 5 corresponds to numbers added to arrows shown in FIG. 4. For example, in mode transition M3 shown in FIG. 5, an operation which becomes a trigger of the mode transition is "TCR MODE button ON", and at this time, a process in the mode transition is "SW2 Open". The mode transition M3 corresponds to M3 directed from "REDY TSTRT" toward "REDY TCR" in FIG. 4. In the "REDY TSTRT", a TCR MODE button is turned on. Then, the SW2 is opened, and the mode transition is performed from "REDY TSTRT" to "REDY TCR".

Here, mode transition when the driver operates the operation panel 120 will be described with reference to FIGS. 4 and 5.

A mode before the driver operates the operation panel 120 is an "OFF" mode shown in FIG. 4. The "OFF" mode is a mode indicating a state where the operation panel 120 is not operated.

First, a case where the driver turns on the key switch SW6 of the operation panel 120 in the "OFF" mode will be described. In this case, the operation panel 120 outputs a signal depending on an operation of turning on the key switch SW6 to the charging instruction output unit 102 and the travel instruction output unit 103. Then, the charging instruction output unit 102 outputs a terminal charging standby stop instruction to the switch control unit 20 according to the input signal. Further, the travel instruction output unit 103 outputs a travel start instruction to the switch control unit 20 according to the input signal. The switch control unit 20 performs control so that the switch SW1 shown in FIG. 1 is closed, the switch SW2 is closed, the switch SW3 is closed, the switch SW4 is opened, and the switch SW5 is opened, based on the input instructions. That is, the main battery which is the secondary battery 30 is connected to the drive inverter 40 and the auxiliary inverter 60 through the switches SW1 to SW3. Further, the power reception unit 101 is disconnected from the first power supply device 2 and the second power supply device 3. In addition, a voltage of the secondary battery 30 is converted into a voltage for driving the travel motor 50 by the drive inverter 40. Furthermore, the voltage of the secondary battery 30 is converted into a voltage to be supplied to the load 90 by the auxiliary inverter 60. Thus, the vehicle 1 is brought into a state where traveling is possible.

Here, the charging control device 10 performs mode transition from "OFF" to "REDY TSTRT" (mode transition M1). Further, the charging control device 10 turns on the LED 210 for "REDY TSTRT".

A case where the driver turns off the key switch SW6 of the operation panel 120 in the "REDY TSTRT" mode will be described. In this case, the operation panel 120 outputs a signal depending on an operation of turning off the key switch SW6 to the charging instruction output unit 102 and the travel instruction output unit 103. Then, the charging instruction output unit 102 outputs a terminal charging standby stop instruction to the switch control unit 20 according to the input signal. Further, the travel instruction output unit 103 outputs a travel prohibition instruction to the switch control unit 20 according to the input signal. The switch control unit 20 performs control so that the switch SW3 is opened, the switch SW2 is opened, the switch SW1 is opened, the switch SW4 is opened, and the switch SW5 is opened according to the input instructions. That is, the main battery which is the secondary battery 30 is disconnected from the drive inverter 40 and the auxiliary inverter 60. Further, the power reception unit 101 is disconnected from the first power supply device 2 and the second power supply device 3. Thus, the vehicle 1 is brought into a stop state where traveling and charging are not performed.

Here, the charging control device 10 performs mode transition from "REDY TSTRT" to "OFF" (mode transition M2). Further, the charging control device 10 turns off the LED 210 for "REDY TSTRT".

A case where in the "REDY TSTRT" mode, the driver operates an accelerator, a brake, a steering wheel, or the like to stop the vehicle 1 at a power supply area such as a bus stop where the first power supply device 2 is provided will be described. In this case, the pantographs 100 of the vehicle 1 are in contact with the terminals 202 of the first power supply device 2. Here, when the driver presses the push-button switch 330 of the operation panel 120 for terminal charging to turn on the TCR MODE button, the operation panel 120 outputs a signal depending on an operation of turning on the TCR MODE button to the charging instruction output unit 102 and the travel instruction output unit 103. Then, the charging instruction output unit 102 outputs a terminal charging standby instruction to the switch control unit 20 according to the input signal. Further, the travel instruction output unit 103 outputs a travel prohibition instruction to the switch control unit 20 according to the input signal. The switch control unit 20 performs control so that the switch SW2 is opened based on the input instructions. That is, the main battery which is the secondary battery 30 is disconnected from the drive inverter 40. Further, the main battery which is the secondary battery 30 is connected to the auxiliary inverter 60, and the power reception unit 101 is disconnected from the first power supply device 2 and the second power supply device 3. Thus, the vehicle 1 is brought into a state where traveling is not possible.

Here, the charging control device 10 performs mode transition from "REDY TSTRT" to "REDY TCR" (mode transition M3). Further, the charging control device 10 turns off the LED 210 for "REDY TSTRT", and turns on the LED 230 for "REDY TCR". The "REDY TCR" mode is a mode where the vehicle 1 cannot travel when performing terminal charging.

The vehicle 1 prevents starting of traveling while the secondary battery 30 is being charged, in the "REDY TCR" mode.

A case where in the "REDY TCR" mode, the driver presses the push-button switch 340 of the operation panel 120 to turn on the TCR STRT button in a state where the pantographs 100 of the vehicle 1 are in contact with the terminals 202 of the first power supply device will be described. In this case, the operation panel 120 outputs a signal depending on an operation of turning on the TCR STRT button to the charging instruction output unit 102 and the travel instruction output unit 103. Then, the charging instruction output unit 102 outputs a terminal charging start instruction to the switch control unit 20 according to the input signal. Further, the travel instruction output unit 103 outputs a travel prohibition instruction to the switch control unit 20 according to the input signal. The switch control unit 20 performs control so that the switch SW4 is closed based on the input instructions. That is, the main battery which is the secondary battery 30 is connected to the first power supply device 2 through the power reception unit 101. Further, the main battery which is the secondary battery is disconnected from the drive inverter 40. In addition, the main battery which is the secondary battery 30 is connected to the auxiliary inverter 60. Thus, when the charging instruction output unit 102 outputs the charging start instruction of the secondary battery 30, the secondary battery 30 and the travel motor 50 are electrically insulated from each other. The secondary battery 30 of the vehicle 1 receives power from the first power supply device 2, and starts charging.

Here, the charging control device 10 performs mode transition from "REDY TCR" to "CON TCR" (mode transition M4). Further, the charging control device 10 turns off the LED 230 for "REDY TCR", and turns on the LED 240 for "CON TCR". The "CON TCR" mode is a mode indicating that the secondary battery 30 is being charged from the first power supply device 2.

A case where in the "CON TCR" mode, the driver presses the push-button switch 350 of the operation panel 120 to turn on a TCR STOP button will be described. In this case, the operation panel 120 outputs a signal depending on an operation of turning on the TCR STOP button to the charging instruction output unit 102 and the travel instruction output unit 103 from the operation panel 120. Then, the charging instruction output unit 102 outputs a terminal charging standby instruction to the switch control unit 20 according to the input signal. Further, the travel instruction output unit 103 outputs a travel prohibition instruction to the switch control unit 20 according to the input signal. The switch control unit 20 performs control so that the switch SW4 is opened based on the input instructions. The main battery which is the secondary battery 30 is disconnected from the drive inverter 40, and is connected to the auxiliary inverter 60. Further, the power reception unit 101 is disconnected from the first power supply device 2 and the second power supply device 3. Thus, when the charging instruction output unit 102 outputs the charging standby instruction of the secondary battery 30, the secondary battery 30 and the travel motor 50 are electrically insulated from each other. The secondary battery 30 which is being charged stops receiving power from the first power supply device 2, and terminates the terminal charging process. In this way, when the driver turns on the TCR STOP button even though the secondary battery 30 is being charged, the charging control device 10 can complete the terminal charging process of the secondary battery 30.

Here, the charging control device 10 performs mode transition from "CON TCR" to "REDY TCR" (mode transition M5). Further, the charging control device 10 turns off the LED 240 for "CON TCR", and turns on the LED 230 for "REDY TCR".

A case where in the "REDY TCR" mode, the driver presses the push-button switch 310 of the operation panel 120 to turn on a DRV MODE button will be described. In this case, the operation panel 120 outputs a signal depending on an operation of turning on the DRV MODE button to the charging instruction output unit 102 and the travel instruction output unit 103 from the operation panel 120. Then, the charging instruction output unit 102 outputs a terminal charging standby instruction to the switch control unit 20 according to the input signal. Further, the travel instruction output unit 103 outputs a travel start instruction to the switch control unit 20 according to the input signal. The switch control unit 20 performs control so that the switch SW2 is closed based on the input instructions. That is, the main battery which is the secondary battery 30 is connected to the drive inverter 40 through the switches SW1 and SW2. Further, the main battery which is the secondary battery 30 is connected to the auxiliary inverter 60. The power reception unit 101 is disconnected from the first power supply device 2 and the second power supply device 3. Thus, the vehicle 1 is brought into a state where traveling is possible.

Here, the charging control device 10 performs mode transition from "REDY TCR" to "REDY TSTRT" (mode transition M6). Further, the charging control device 10 turns off the LED 230 for "REDY TCR", and turns on the LED 210 for "REDY TSTRT".

The depot charging may be considered in a similar manner to the terminal charging.

A case where in the "REDY TSTRT" mode, the driver operates an accelerator, a brake, a steering wheel, or the like to stop the vehicle 1 at a power supply area such as a vehicle base where the second power supply device 3 is provided and presses the push-button switch 320 of the operation panel 120 to turn on a DCR MODE button will be described. In this case, the operation panel 120 outputs a signal depending on an operation of turning on the DCR MODE button to the charging instruction output unit 102 and the travel instruction output unit 103 from the operation panel 120. Then, the charging instruction output unit 102 outputs a depot charging standby instruction to the switch control unit 20 according to the input signal. Further, the travel instruction output unit 103 outputs a travel prohibition instruction to the switch control unit 20 according to the input signal. The switch control unit 20 performs control so that the switch SW2 is opened and the switch SW5 is closed based on the input instructions. That is, the main battery which is the secondary battery 30 is disconnected from the drive inverter 40. Further, the power reception unit 101 is connected to the second power supply device 3. In addition, the main battery which is the secondary battery 30 is connected to the auxiliary inverter 60. The power reception unit 101 is disconnected from the first power supply device 2. Thus, when the charging instruction output unit 102 outputs the charging standby instruction of the secondary battery 30, the secondary battery 30 and the travel motor 50 are electrically insulated from each other. Further, the vehicle 1 is brought into a state where traveling cannot be performed.

Here, the charging control device 10 performs mode transition from "REDY TSTRT" to "REDY DCR" (mode transition M7). Further, the charging control device 10 turns off the LED 210 for "REDY TSTRT", and turns on the LED 220 for "REDY DCR". The "REDY DCR" mode is a mode where the vehicle 1 cannot travel when performing depot charging.

The vehicle 1 prevents starting of traveling while the secondary battery 30 is being charged, in the "REDY DCR" mode.

A case where in the "REDY DCR" mode, the driver connects the connector 110 of the vehicle 1 to the connector 302 of the second power supply device 3 will be described. In this case, if the charging start button installed in the depot charger or the like is pressed, the secondary battery 30 of the vehicle 1 receives power from the second power supply device 3, and starts charging.

Here, the charging control device 10 performs mode transition from "REDY DCR" to "CON DCR" (mode transition M8). Further, the charging control device 10 turns off the LED 220 for "REDY DCR", and turns on the LED 250 for "CON DCR". The "CON DCR" mode is a mode indicating that the secondary battery 30 is being charged from the second power supply device 3.

A case where in the "CON DCR" mode, the driver disconnects the connector 110 of the vehicle 1 from the connector 302 of the second power supply device 3 will be described. In this case, the secondary battery 30 which is being charged stops receiving power from the second power supply device 3, and terminates the depot charging process.

Here, the charging control device 10 performs mode transition from "CON DCR" to "REDY DCR" (mode transition M9). Further, the charging control device 10 turns off the LED 250 for "CON DCR", and turns on the LED 220 for "REDY DCR".

A case where in the "REDY DCR" mode, the driver presses the push-button switch 310 of the operation panel 120 to turn on the DRV MODE button will be described. In this case, the operation panel 120 outputs a signal depending on an operation of turning on the DRV MODE button to the charging instruction output unit 102 and the travel instruction output unit 103 from the operation panel 120. Then, the charging instruction output unit 102 outputs a depot charging standby stop instruction to the switch control unit 20 according to the input signal. Further, the travel instruction output unit 103 outputs a travel start instruction to the switch control unit 20 according to the input signal. The switch control unit 20 performs control so that the switch SW2 is closed, and the switch SW5 is opened, based on the input instructions. That is, the main battery which is the secondary battery is connected to the drive inverter 40 through the switches SW1 and SW2. Further, the power reception unit 101 is disconnected from the second power supply device 3. In addition, the main battery which is the secondary battery 30 is connected to the auxiliary inverter 60. The power reception unit 101 is disconnected from the first power supply device 2. Thus, the vehicle 1 is brought into a state where traveling is possible.

Here, the charging control device 10 performs mode transition from "REDY DCR" to "REDY TSTRT" (mode transition M10). Further, the charging control device 10 turns on the LED 220 for "REDY DCR", and turns on the LED 210 for "REDY TSTRT".

A case where in the "REDY DCR" mode, the driver presses the push-button switch 330 of the operation panel 120 to turn on the TCR MODE button will be described. In this case, the operation panel 120 outputs a signal depending on an operation of turning on the TCR MODE button to the charging instruction output unit 102 and the travel instruction output unit 103 from the operation panel 120. Then, the charging instruction output unit 102 outputs a terminal charging standby instruction to the switch control unit 20 according to the input signal. Further, the travel instruction output unit 103 outputs a travel prohibition instruction to the switch control unit 20 according to the input signal. The switch control unit 20 performs control so that the switch SW5 is opened based on the input instructions. That is, the power reception unit 101 is disconnected from the second power supply device 3. In addition, the main battery which is the secondary battery 30 is disconnected from the drive inverter 40, and is connected to the auxiliary inverter 60. Furthermore, the power reception unit 101 is disconnected from the first power supply device 2. Thus, when the charging instruction output unit 102 outputs the charging standby instruction of the secondary battery 30, the secondary battery 30 and the travel motor 50 are electrically insulated from each other.

Here, the charging control device 10 performs mode transition from "REDY DCR" to "REDY TCR" (mode transition M11). Further, the charging control device 10 turns off the LED 220 for "REDY DCR", and turns on the LED 230 for "REDY TCR".

A case where in the "REDY TCR" mode, the driver presses the push-button switch 320 of the operation panel 120 to turn on the DCR MODE button will be described. In this case, the operation panel 120 outputs a signal depending on an operation of turning on the DCR MODE button to the charging instruction output unit 102 and the travel instruction output unit 103 from the operation panel 120. Then, the charging instruction output unit 102 outputs a depot charging standby instruction to the switch control unit 20 according to the input signal. Further, the travel instruction output unit 103 outputs a travel prohibition instruction to the switch control unit 20 according to the input signal. The switch control unit 20 performs control so that the switch SW5 is closed based on the input instructions. That is, the power reception unit 101 is connected to the second power supply device 3. In addition, the main battery which is the secondary battery is disconnected from the drive inverter 40, and is connected to the auxiliary inverter 60. Furthermore, the power reception unit 101 is disconnected from the first power supply device 2. Thus, when the charging instruction output unit 102 outputs the charging standby instruction of the secondary battery 30, the secondary battery 30 and the travel motor 50 are electrically insulated from each other.

Here, the charging control device 10 performs mode transition from "REDY TCR" to "REDY DCR" (mode transition M12). Further, the charging control device 10 turns off the LED 230 for "REDY TCR", and turns on the LED 220 for "REDY DCR".

A case where the driver turns off the key switch SW6 of the operation panel 120 in the "CON DCR" mode will be described. In this case, the operation panel 120 outputs a signal depending on an operation of turning off the key switch SW6 to the charging instruction output unit 102 and the travel instruction output unit 103 from the operation panel 120. Then, the charging instruction output unit 102 outputs a depot charging stop instruction to the switch control unit 20 according to the input signal. Further, the travel instruction output unit 103 outputs a travel prohibition instruction to the switch control unit 20 according to the input signal. The switch control unit 20 performs control so that the switch SW3 is opened, the switch SW1 is opened, and the switch SW5 is opened, based on the input instructions. That is, the main battery which is the secondary battery 30 is disconnected from the drive inverter 40 and the auxiliary inverter 60. Further, the power reception unit 101 is disconnected from the second power supply device 3. In addition, the power reception unit 101 is disconnected from the first power supply device 2. Thus, when the vehicle 1 is brought into a stop state where traveling and charging are not performed.

Here, the charging control device 10 performs mode transition from "CON DCR" to "OFF" (mode transition M13). Further, the charging control device 10 turns off the LED 250 for "CON DCR".

A case where the driver turns off the key switch SW6 of the operation panel 120 in the "REDY DCR" mode will be described. In this case, the operation panel 120 outputs a signal depending on an operation of turning off the key switch SW6 to the charging instruction output unit 102 and the travel instruction output unit 103 from the operation panel 120. Then, the charging instruction output unit 102 outputs a depot charging standby stop instruction to the switch control unit 20 according to the input signal. Further, the travel instruction output unit 103 outputs a travel prohibition instruction to the switch control unit 20 according to the input signal. The switch control unit 20 performs control so that the switch SW3 is opened, the switch SW1 is opened, and the switch SW5 is opened, based on the input signal. That is, the main battery which is the secondary battery 30 is disconnected from the drive inverter 40 and the auxiliary inverter 60. Further, the power reception unit 101 is disconnected from the second power supply device 3. Thus, the power reception unit 101 is disconnected from the first power supply device 2. Thus, the vehicle 1 is brought into a stop state where traveling and charging are not performed.

Here, the charging control device 10 performs mode transition from "REDY DCR" to "OFF" (mode transition M14). Further, the charging control device 10 turns off the LED 220 for "REDY DCR".

A case where the driver turns off the key switch SW6 of the operation panel 120 in the "REDY TCR" mode will be described. In this case, the operation panel 120 outputs a signal depending on an operation of turning off the key switch SW6 to the charging instruction output unit 102 and the travel instruction output unit 103 from the operation panel 120. Then, the charging instruction output unit 102 outputs a terminal charging standby stop instruction to the switch control unit 20 according to the input signal. Further, the travel instruction output unit 103 outputs a travel prohibition instruction to the switch control unit 20 according to the input signal. The switch control unit 20 performs control so that the switch SW3 is opened and the switch SW1 is opened based on the input instructions. That is, the main battery which is the secondary battery is disconnected from the drive inverter 40 and the auxiliary inverter 60. Further, the power reception unit 101 is disconnected from the first power supply device 2 and the second power supply device 3. Thus, the vehicle 1 is brought into a stop state where traveling and charging are not performed.

Here, the charging control device 10 performs mode transition from "REDY TCR" to "OFF" (mode transition M15). Further, the charging control device 10 turns off the LED 230 for "REDY TCR".

A case where the driver turns off the key switch SW6 of the operation panel 120 in the "CON DCR" mode will be described. In this case, the operation panel 120 outputs a signal depending on an operation of turning off the key switch SW6 to the charging instruction output unit 102 and the travel instruction output unit 103 from the operation panel 120. Then, the charging instruction output unit 102 outputs a terminal charging stop instruction to the switch control unit 20 according to the input signal. Further, the travel instruction output unit 103 outputs a travel prohibition instruction to the switch control unit 20 according to the input signal. The switch control unit 20 performs control so that the switch SW3 is opened, the switch SW1 is opened, and the switch SW4 is opened, based on the input signal. That is, the main battery which is the secondary battery 30 is disconnected from the drive inverter 40 and the auxiliary inverter 60. Further, the power reception unit 101 is disconnected from the first power supply device 2. Thus, the power reception unit 101 is disconnected from the second power supply device 3. Thus, the vehicle 1 is brought into a stop state where traveling and charging are not performed.

Here, the charging control device 10 performs mode transition from "CON TCR" to "OFF" (mode transition M16). Further, the charging control device 10 turns off the LED 240 for "CON TCR".

In all the modes, for example, a case where a device such as the battery system controller 70 or the battery management unit 80 detects an abnormality of a voltage or the like will be described. The device that detects the abnormality outputs an abnormality detection signal to the switch control unit 20. When the abnormality detection signal is input, the switch control unit 20 performs control so that all the switches are opened.

Here, the charging control device 10 performs mode transition from the respective modes to "ALARM" (mode transition M17). Further, the charging control device 10 causes the LED 260 for "ALARM" to blink.

A case where the driver presses the push-button switch 360 of the operation panel 120 in the "ALARM" mode, that is, a case where a RESET button is turned on will be described. In this case, the operation panel 120 outputs a signal depending on an operation of turning on the RESET button to the charging instruction output unit 102 and the travel instruction output unit 103 from the operation panel 120. Then, the charging instruction output unit 102 outputs a terminal charging standby stop instruction to the switch control unit 20 according to the input signal. Further, the travel instruction output unit 103 outputs a travel start instruction to the switch control unit 20 according to the input signal. The switch control unit 20 performs control so that the switch SW1 is closed, the switch SW2 is closed, the switch SW3 is closed, the switch SW4 is opened, and the switch SW5 is opened, based on the input instructions. That is, the main battery which is the secondary battery 30 is connected to the drive inverter 40 and the auxiliary inverter 60 through the switches SW1 to SW3. Further, the power reception unit 101 is disconnected from the first power supply device 2 and the second power supply device 3.

Here, the charging control device 10 performs mode transition from "ALARM" to "REDY TSTRT" (mode transition M18). Further, the charging control device 10 turns off the LED 260 for "ALARM", and turns on the LED 210 for "REDY TSTRT".

As described above, the vehicle 1 can prevent starting of traveling while the secondary battery 30 is being charged, and can start traveling when the charging of the secondary battery 30 is completed.

Button operations other than the above-described operations are invalid, and in this case, mode transition does not occur.

In the above-described embodiment, a case where the driver operates the operation panel 120 to perform mode transition is described, but the invention is not limited thereto. For example, in the mode transition 4, contact between the pantographs 100 and the terminals 202 is detected. Further, the computer of the charging control device 10 transmits a signal to the charging instruction output unit 102 and the travel instruction output unit 103, based on an algorithm of a program which is read and executed and the detection result of the contact between the pantographs 100 and the terminals 202. Further, the charging instruction output unit 102 may output a charging instruction based on the input signal. Further, the travel instruction output unit 103 may output a travel instruction based on a charging completion detection result. For example, in the mode transition 5, it is detected that a charging rate of the secondary battery 30 exceeds a threshold value. In addition, the computer of the charging control device 10 may perform automatic determination based on an algorithm of a program which is read and executed and the detection result to perform mode transition.

Further, the mode transition may be a combination of the mode transition for allowing the driver to operate the operation panel 120 and the mode transition for performing automatic determination based on the algorithm of the program to be executed by the computer and the charging completion detection result.

Further, in the above-described embodiment, as the vehicle charging system 200, a case where the second power supply device 3 is provided is described, but the vehicle charging system 200 is not limited thereto. For example, the vehicle charging system 200 may have a configuration in which only the first power supply device 2 is provided as a power supply device.

Further, in the above-described embodiment, a case where the charging of the secondary battery 30 from the first power supply device 2 is performed through the pantographs 100 is described, but the charging of the secondary battery 30 from the first power supply device 2 is not limited thereto. For example, the charging of the secondary battery 30 from the first power supply device 2 may be performed in a non-contact manner.

Further, each switch in the invention may be any switch as long as it can be appropriately operated. For example, the switch may be a transmission gate using a transistor.

Further, the charging control device 10 in the invention may function as a part of the battery system controller 70.

The charging control device 10, the vehicle 1 that includes the charging control device 10, and the vehicle charging system 200 that includes the vehicle 1 according to the embodiment of the invention have been described.

The charging control device 10 according to the embodiment of the invention includes the power reception unit 101, the charging instruction output unit 102, and the travel instruction output unit 103. The power reception unit 101 receives power from the first power supply device 2 when the power reception unit 101 is present in a power supply area where power from the first power supply device 2 can be supplied. The charging instruction output unit 102 outputs a charging instruction relating to charging of the secondary battery 30 using power received by the power reception unit 101. The travel instruction output unit 103 outputs a travel instruction relating to traveling of the vehicle. When the charging instruction output unit 102 outputs a charging start instruction as the charging instruction for the secondary battery 30, the secondary battery 30 and the travel motor 50 are electrically insulated from each other, and when the travel instruction output unit 103 outputs a travel start instruction for the vehicle 1, the secondary battery 30 and the travel motor 50 are electrically connected to each other.

With such a configuration, the vehicle 1 can prevent starting of traveling while the secondary battery 30 is being charged, and can start traveling when the charging of the secondary battery 30 is completed.

The embodiment of the invention has been described, but the charging control device 10 includes a computer system therein. Further, the procedure of the above-described processes is stored in a computer-readable recording medium in a program format, and as the computer reads and executes the program, the processes are performed. Here, the computer-readable recording medium refers to a magnetic disk, a magneto-optical disc, a CD-ROM, a DVD-ROM, a semiconductor memory, or the like. Further, the computer program may be distributed to the computer through a communication line, and the computer that receives the distribution may execute the program.

Further, the program may realize a part of the above-described functions. In addition, the program may be a file capable of being realized by combination with a program which is stored in advance in the computer system, that is, a so-called a differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

INDUSTRIAL APPLICABILITY

According to the vehicle, the vehicle charging system, the charging control method, and the program described above, the vehicle can prevent starting of traveling while the secondary battery is being charged, and can start traveling when the charging of the secondary battery is completed.

REFERENCE SIGNS LIST

1 VEHICLE
2 FIRST POWER SUPPLY DEVICE
3 SECOND POWER SUPPLY DEVICE
10 CHARGING CONTROL DEVICE
20 SWITCH CONTROL UNIT
30 SECONDARY BATTERY
40 DRIVE INVERTER
50 TRAVEL MOTOR
60 AUXILIARY INVERTER
70 BATTERY SYSTEM CONTROLLER
80 BATTERY MANAGEMENT UNIT
90 LOAD (AIR CONDITIONER OR THE LIKE)
100, 100a, 100b PANTOGRAPH
101 POWER RECEPTION UNIT
102 CHARGING INSTRUCTION OUTPUT UNIT
103 TRAVEL INSTRUCTION OUTPUT UNIT
110, 302 CONNECTOR
120 OPERATION PANEL
130 DIRECT CURRENT VOLTAGE SOURCE
200 VEHICLE CHARGING SYSTEM
201 TERMINAL CHARGER
202a TERMINAL (P-POLE)
202b TERMINAL (N-POLE)
210, 220, 230, 240, 250, 260 LED
301 DEPOT CHARGER
310, 320, 330, 340, 350, 360 PUSH-BUTTON SWITCH
SW1, SW2, SW3, SW4, SW5 SWITCH
SW6 KEY SWITCH

The invention claimed is:

1. A charging control device included in a vehicle in which a charging of a secondary battery is performed through pantographs from a terminal charger, and even after the charging of the secondary battery is completed, the pantographs remain in contact with the terminal charger of a power supply device, comprising:
   a power receiver that is connected to the secondary battery via a first switch, is connected to a drive inverter via a second switch, is connected to an auxiliary inverter via a third switch, is connected to the terminal charger via a fourth switch, and is connected to a depot charger via fifth switch, and that receives power from the terminal charger when the power receiver is present in a power supply area where the power from the terminal charger can be supplied;
   a charging instruction output unit that outputs a charging instruction relating to charging of a secondary battery using the power received by the power receiver; and
   a travel instruction output unit that outputs a travel instruction relating to traveling of the vehicle,
   wherein the secondary battery and a travel motor are electrically insulated from each other when the charging instruction output unit outputs a charging start instruction as the charging instruction for the secondary battery, and
   the secondary battery and the travel motor are electrically connected to each other when the travel instruction output unit outputs a travel start instruction for the vehicle, and
   in a terminal charging start mode in which the charging of the secondary battery is performed by power that the power receiver receives from the terminal charger upon shorting the first switch between the power receiver and the secondary battery, opening the second switch between the drive inverter that drives the travel motor and the power receiver, shorting the third switch between the auxiliary inverter that drives a load and the power receiver, shorting the fourth switch between the power receiver and the terminal charger, and opening the fifth switch between the depot charger and the power receiver, the depot charger performing charging of the secondary battery through a connector included in the power supply device,
   the charging control device determines to allow only operations of mode transition to an operation panel from the terminal charging start mode to one of three modes, the three modes being a mode in which the operation panel do not accept the operation, a terminal charging standby mode, and an abnormality mode,
   the charging control device opens the first switch, the second switch, the third switch, the fourth switch, and the fifth switch in the mode that do not accept the operation,
   the charging control device shorts the first switch and the third switch, and opens the second switch, the fourth switch, and the fifth switch in the terminal charging standby mode,
   the charging control device opens the first switch, the second switch, the third switch, the fourth switch, and the fifth switch in the abnormality mode.

2. The charging control device according to claim 1, wherein the charging instruction output unit outputs the charging instruction based on pressing of a button, and the travel instruction output unit outputs the travel start instruction based on pressing of a button.

3. The charging control device according to claim 2, wherein the buttons are provided in a panel installed in a driver's cab of the vehicle.

4. The charging control device according to claim 1, wherein the charging instruction control unit outputs the charging instruction based on an algorithm of a program to be read and executed by a computer of the charging control device, and
   the travel instruction output unit outputs the travel instruction based on the algorithm of the program to be read and executed by the computer of the charging control device.

5. A vehicle comprising the charging control device according to claim 1.

6. A vehicle charging system comprising:
   the vehicle according to claim 5; and
   a power supply device that supplies power through a power reception unit of the vehicle.

7. The charging control device according to claim 1, wherein the power supply device includes the depot charger,
   in a depot charging start mode in which the charging of the secondary battery is performed by power that the power reception unit receives from the depot charger upon shorting the first switch, the third switch, and the fifth switch, and opening the second switch and the fourth switch, the charging control device determines to allow only operations of mode transition to the operation panel from the depot charging start mode to a mode other than three modes, the three modes being the mode in which the operation panel do not accept the operation, a depot charging standby mode, and the abnormality mode, the charging control device opens the first switch, the second switch, the third switch, the fourth switch, and the fifth switch in the mode that do not accept the operation, the charging control device shorts the first switch, the third switch, and the fifth switch, and opens the second switch and the fourth switch in the depot charging standby mode, the charging control device opens the first switch, the second switch, the third switch, the fourth switch, and the fifth switch in the abnormality mode.

8. A charging control method of a charging control device included in a vehicle in which a charging of a secondary battery is performed through pantographs from a terminal charger, and even after the charging of the secondary battery is completed, the pantographs remain in contact with the terminal charger of a power supply device, comprising:

receiving power from the terminal charger when a power reception unit is present in a power supply area where the power from the terminal charger can be supplied, wherein the power reception unit is connected to the secondary battery via a first switch, is connected to a drive inverter via a second switch, is connected to an auxiliary inverter via a third switch, is connected to the terminal charger via a fourth switch, and is connected to a depot charger via a fifth switch;

outputting a charging instruction relating to charging of a secondary battery using the power received by the power reception unit; and outputting a travel instruction relating to traveling of the vehicle provided with the charging control method;

electrically insulating the secondary battery and a travel motor when a charging start instruction is output as the charging instruction for the secondary battery;

electrically connecting the secondary battery and the travel motor when a travel start instruction for the vehicle is output, and in a terminal charging start mode in which the charging of the secondary battery is performed by power that the power reception unit receives from the terminal charger upon shorting the first switch between the power reception unit and the secondary battery, opening the second switch between the drive inverter that drives the travel motor and the power reception unit, shorting the third switch between the auxiliary inverter that drives a load and the power reception unit, shorting the fourth switch between the power reception unit and the terminal charger, and opening the fifth switch between the depot charger and the power reception unit, the depot charger performing charging the secondary battery through a connector included in the power supply device, determining to allow only operations of mode transition to an operation panel from the terminal charging start mode to one of three modes, the three modes being a mode in which the operation panel do not accept the operation, a terminal charging standby mode, and an abnormality mode, opening the first switch, the second switch, the third switch, the fourth switch, and the fifth switch in the mode that do not accept the operation, shorting the first switch and the third switch, and opening the second switch, the fourth switch, and the fifth switch in the terminal charging standby mode, opening the first switch, the second switch, the third switch, the fourth switch, and the fifth switch in the abnormality mode.

9. A computer program product including programmed instructions embodied in and stored on a non-transitory computer readable medium for a charging control device, wherein the instructions, when executed by a computer, cause the computer to perform:

receiving power from the terminal charger when a power reception unit is present in a power supply area where the power from the terminal charger can be supplied, wherein the power reception unit is connected to the secondary battery via a first switch, is connected to a drive inverter via a second switch, is connected to an auxiliary inverter via a third switch, is connected to the terminal charger via a fourth switch, and is connected to a depot charger via a fifth switch;

outputting a charging instruction relating to charging of the secondary battery using the power received by the power reception unit; and outputting a travel instruction relating to traveling of the vehicle, electrically insulating the secondary battery and a travel motor when the charging instruction output unit outputs a charging start instruction as the charging instruction for the secondary battery, electrically connecting the secondary battery and the travel motor when the travel instruction output unit outputs a travel start instruction for the vehicle, and in a terminal charging start mode in which the charging of the secondary battery is performed by power that the power reception unit receives from the terminal charger upon shorting the first switch between the power reception unit and the secondary battery, opening the second switch between the drive inverter that drives the travel motor and the power reception unit, shorting the third switch between the auxiliary inverter that drives a load and the power reception unit, shorting the fourth switch between the power reception unit and the terminal charger, and opening the fifth switch between the depot charger and the power reception unit, the depot charger performing charging the secondary battery through a connector included in the power supply device, determining to allow only operations of mode transition to an operation panel from the terminal charging start mode to one of three modes, the three modes being a mode in which the operation panel do not accept the operation, a terminal charging standby mode, and an abnormality mode, opening the first switch, the second switch, the third switch, the fourth switch, and the fifth switch in the mode that do not accept the operation, shorting the first switch and the third switch, and opening the second switch, the fourth switch, and the fifth switch in the terminal charging standby mode, opening the first switch, the second switch, the third switch, the fourth switch, and the fifth switch in the abnormality mode.

* * * * *